United States Patent
Lee et al.

(10) Patent No.: US 9,071,022 B2
(45) Date of Patent: Jun. 30, 2015

(54) POWER PLUG HAVING A UNIVERSAL SERIAL BUS PORT FOR AN ELECTRICAL APPLIANCE

(71) Applicant: Powertech Industrial Co., Ltd., New Taipei (TW)

(72) Inventors: Yu-Lung Lee, New Taipei (TW); Yu Hsuan Chen, New Taipei (TW)

(73) Assignee: Powertech Industrial Co., Ltd., New Taipei (TW)

( * ) Notice: Subject to any disclaimer, the term of this patent is extended or adjusted under 35 U.S.C. 154(b) by 31 days.

(21) Appl. No.: 14/017,469

(22) Filed: Sep. 4, 2013

(65) Prior Publication Data

US 2014/0004730 A1    Jan. 2, 2014

Related U.S. Application Data

(63) Continuation-in-part of application No. 13/088,523, filed on Apr. 18, 2011, now Pat. No. 8,965,717.

(51) Int. Cl.
| | |
|---|---|
| *H01R 27/00* | (2006.01) |
| *H01R 13/642* | (2006.01) |
| *G01D 4/00* | (2006.01) |

(52) U.S. Cl.
CPC ............. *H01R 13/642* (2013.01); *H01R 27/00* (2013.01); *Y02B 70/3266* (2013.01); *Y02B 90/241* (2013.01); *Y02B 70/343* (2013.01); *Y04S 20/242* (2013.01); *Y04S 20/32* (2013.01); *Y04S 20/34* (2013.01); *G01D 4/002* (2013.01)

(58) Field of Classification Search
USPC .................................... 439/18, 638, 218, 501
See application file for complete search history.

(56) References Cited

U.S. PATENT DOCUMENTS

| | | | |
|---|---|---|---|
| 8,011,930 B2 * | 9/2011 | Lee et al. ........................ | 439/18 |
| 8,584,243 B2 * | 11/2013 | Britton et al. ................... | 726/24 |
| 2005/0009404 A1 * | 1/2005 | Lee .............................. | 439/638 |
| 2010/0070217 A1 * | 3/2010 | Shimada et al. ................ | 702/62 |
| 2010/0214541 A1 * | 8/2010 | Chien ........................... | 353/119 |
| 2011/0287665 A1 * | 11/2011 | Chien ........................... | 439/638 |
| 2013/0102174 A1 * | 4/2013 | Brown et al. ................... | 439/218 |
| 2013/0244475 A1 * | 9/2013 | Sayadi et al. ................... | 439/501 |

FOREIGN PATENT DOCUMENTS

| | | |
|---|---|---|
| TW | M348951 U | 1/2009 |
| TW | 200919862 A | 5/2009 |

OTHER PUBLICATIONS

Communication From the Taiwan Patent Office Regarding a Counterpart Application Dated (Taiwan Year 102) Jul. 29, 2013.

* cited by examiner

*Primary Examiner* — Chandrika Prasad
(74) *Attorney, Agent, or Firm* — Rosenberg, Klein & Lee

(57) ABSTRACT

A power plug includes a main body, at least two prongs, and a cable. The main body has a universal serial bus port for receiving a universal serial bus plug. The prongs are disposed on the main body for receiving a power, and the prongs are configured to be insertable into an alternating current source. The cable is disposed on the main body and electrically connected to the prongs, and the cable is electrically connected to the power input end of the electrical appliance.

14 Claims, 7 Drawing Sheets

POWER PLUG HAVING A UNIVERSAL SERIAL BUS PORT FOR AN ELECTRICAL APPLIANCE

REFERENCE TO RELATED APPLICATION

This Application is being filed as a Continuation-in-Part application of Ser. No. 13/088,523, filed 18 Apr. 2011, currently pending.

BACKGROUND

1. Field of the Invention

The instant disclosure relates to a power plug; in particular, to a power plug having a universal serial bus port for receiving a universal serial bus plug.

2. Description of Related Art

Power plugs electrically connected to an alternating current source are commonly used to power an electrical appliance. Many electronic devices use direct currents from a universal serial bus plug to recharge their electronic devices.

However, the power plug and universal serial bus are generally designed to be used separately. Further, a user will need an adapter to power or recharge electronic devices from alternating current sources at home.

SUMMARY OF THE INVENTION

The object of the instant disclosure is to provide a power plug, which is electrically connected to a power input end of an electrical appliance. The power plug includes a main body, at least two prongs, and a cable. The main body has a universal serial bus port for receiving a universal serial bus plug. The prongs are disposed on the main body for receiving a power, and the prongs are configured to be insertable into an alternating current source. The cable is disposed on the main body and electrically connected to the prongs, and the cable is electrically connected to the power input end of the electrical appliance.

In summary, the power plug enhances a consumer's ability to directly use the power plug to recharge or power a portable electronic device that rely on a universal serial bus port for powering or recharging. The power plug having the universal serial bus port is configured to having a compact design, and the consumer don't need an adaptor connected to the power plug to use the power plug to recharge or power a portable electronic device.

In order to further understand the instant disclosure, the following embodiments are provided along with illustrations to facilitate the appreciation of the instant disclosure: however, the appended drawings are merely provided for reference and illustration, without any intention to be used for limiting the scope of the instant disclosure.

BRIEF DESCRIPTION OF THE DRAWINGS

The novel features believed characteristic of the invention are set forth in the appended claims. the invention itself, however, as well as a preferred mode of use, further objectives and advantages thereof, will best be understood by reference to the following detailed description of an illustrative embodiments when read in conjunction with the accompanying drawings, wherein:

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

The power plug 100 is a compact plug with a universal serial bus (USB) port 111 and can be used as an integrated unit as an adaptor to provide direct current to an electrical appliance such as a portable electronic device having a USB plug 300.

Figure 1A:
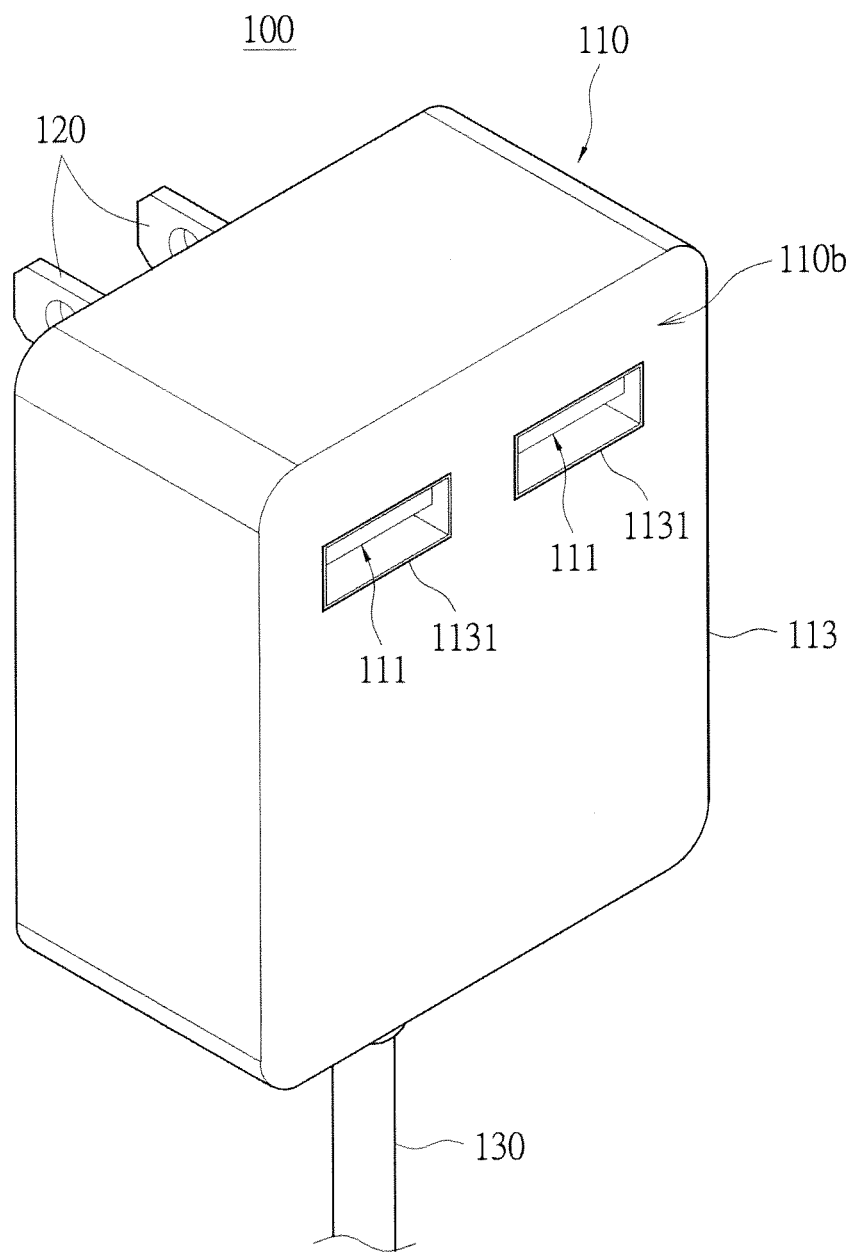
FIGS. 1A and 1B illustrate a perspective view of a power plug in accordance with an embodiment of the instant disclosure.
Figure 1B:
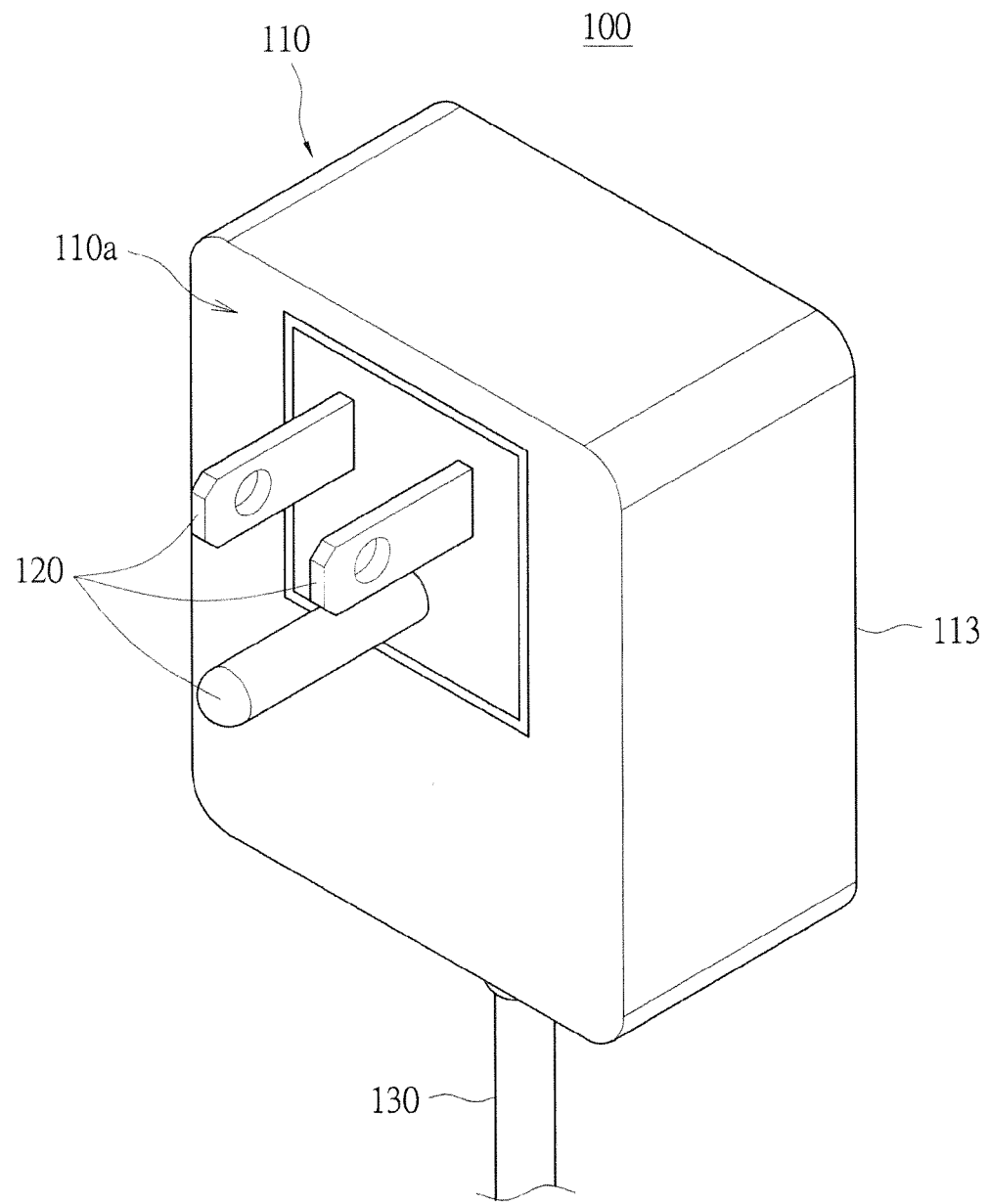
Figure 4:
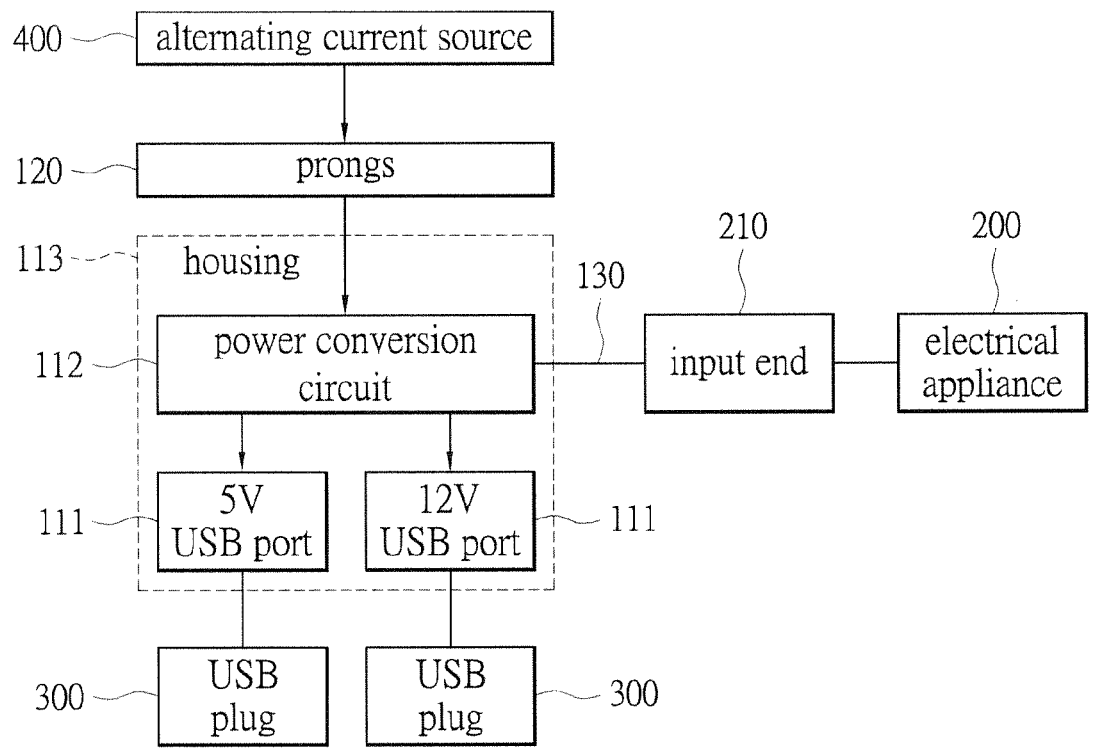
FIG. 4 illustrates a function block diagram for a power plug in accordance with an embodiment of the instant disclosure.

Please refer concurrently to FIGS. 1A and 1B, which illustrate a perspective view of a power plug in accordance with an embodiment of the instant disclosure. The power plug 100 can be electrically connected to a power input end 210 of an electrical appliance 200 such an air conditioner (as shown in FIG. 4). The power plug 100 includes a main body 110, at least two prongs 120, and a cable 130.

The main body 110 has a rectangular plastic housing 113, and the overall shape of the main body 110 has the appearance of a rectangular box having beveled edges. In addition, the main body 110 has at least one universal serial bus port 111 for receiving a USB plug 300. The housing 113 encloses the USB port 111, and the housing 113 has a slot 1131 for exposing the receiving end of the USB port 111.

Specifically, the housing 113 of the main body 110 can be made of nonconductive material. The housing 113 can be formed by a combination of two molded shells, forming an enclosure to house and protect the interior USB port 111.

The USB port 111 may be a USB Type A receptacle for receiving a USB Type A plug. In other exemplary embodiment, the USB port 111 can be any suitable type of receptacle such as Type B, Mini-A and Mini-B, and Micro connector. As shown in the FIG. 1 in the instant disclosure, the main body 110 has two universal serial bus ports 111, and the two USB ports 111 are provided on the same side of the housing 113. Alternatively, the USB ports 111 may be provided on the different sides of the housing 113.

The at least two prongs 120 are disposed on the main body 110 for receiving a power. The prongs 120 are configured to be insertable into an alternating current source 400 (as shown in FIG. 4). Specifically, the prongs 120 can be configured to be insertable into slots of a wall socket for delivering alternating current.

The prongs 120 may be fixed or may be foldable connected, pivotally connected or retractable connected to the main body 110. The housing 113 of the main body 110 may have prong channels (not shown in the figures) for seating the prongs 120. Furthermore, in another exemplary embodiment, the power plug 100 may have only two prongs 120 or have more than three prongs 120, and the prongs 120 may be arranged on different sides of the housing 113.

As shown in the FIG. 1, the main body 110 has a prong end 110a and a port end 110b opposite to the prong end 110a. The prongs 120 are provided on one end (the prong end 110*a*) of the main body 110, and the two USB ports 111 are provided at the other end (the port end 110*b*) of the main body 110.

Figure 5:
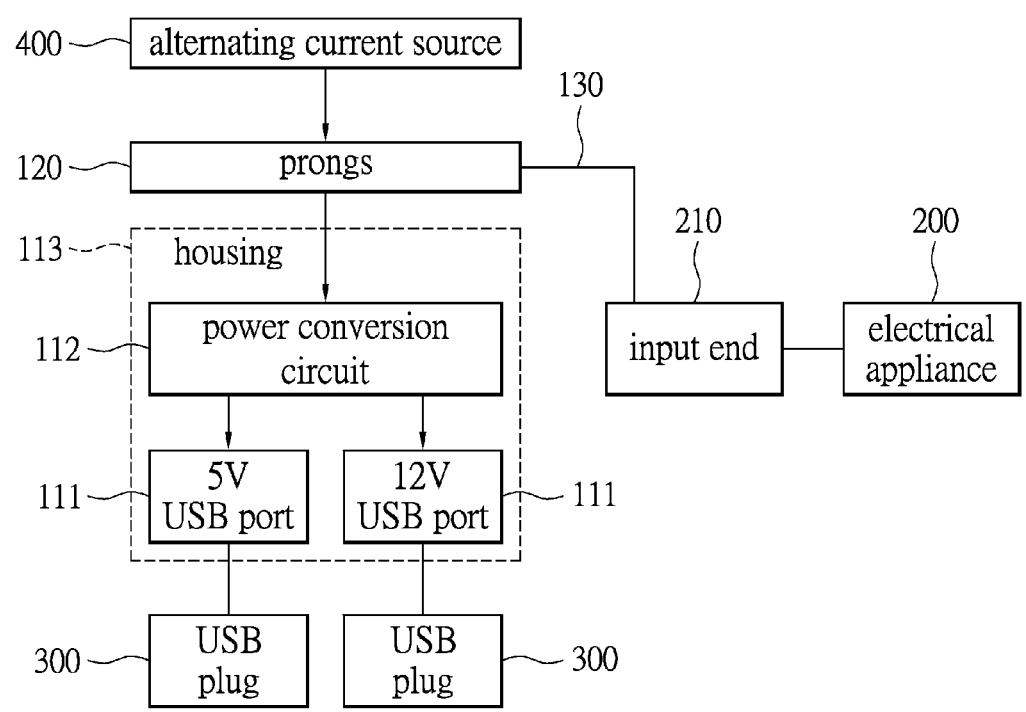
FIG. 5 illustrates a function block diagram for a power plug in accordance with an embodiment of the instant disclosure.

The cable 130 is disposed on the main body 110 and electrically connected to the prongs 120 (as shown in FIG. 5). Further the cable 130 is electrically connected to the power input end 210 of the electrical appliance 200. The power plug 100 can receive power through the prongs 120 from an alternating current source 400, and the power can be supplied to the electrical appliance 200 through the cable 130.

In addition, the main body 110 may further include a power conversion circuit 112 (as shown in FIG. 4) for converting the alternating current to the direct current, and the cable 130 can be electrically connected to the prongs 120 via the power conversion circuit 112. The power conversion circuit 112 is respectively electrically connected to the prongs 120 and the USB port 111. The power conversion circuit 112 can be disposed within the housing 113, and the housing 113 is to house and protect the power conversion circuit 112.

In the instant exemplary embodiment, the power conversion circuit 112 is to convert the alternate current to direct currents respectively having a first voltage level and a second voltage level. For example, the power conversion circuit 112 is to convert the alternate current to both 5V and 12V direct currents. The 5V and 12V direct currents are respectively directed to the USB ports 111 in the housing 113. In an alternative embodiment, two separate power conversion circuits electrically connected to the prongs 120 may be utilized. One of the two separate power conversion circuits is for 5V direct current, while another of the two separate power conversion circuits is for 12V direct current. In an alternative embodiment, the power plug 100 may further include a LED (not shown in the figures) disposed on the main body 110 to indicate that the USB port 111 is receiving power.

Attention is now invited to FIG. 4, which illustrates a function block diagram for a power plug in accordance with an embodiment of the instant disclosure. The power plug 100 includes the main body 110, the prongs 120, and the cable 130. The main body 110 has the housing 113, the USB ports 111, and the power conversion circuit 112. The USB ports 111 and power conversion circuit 112 are arranged internally in the housing 113. The prongs 120 are for electrically connecting to an alternating current source 400. The cable 130 is for electrically connecting to a power input end 210 of an electrical appliance 200. The power conversion circuit 112 is electrically connected to the prongs 120, the cable 130, and the USB ports 111. The USB ports 111 are for receiving universal serial bus plugs 300 respectively.

Please refer to FIG. 5, which illustrates a function block diagram for a power plug in accordance with an embodiment of the instant disclosure. The power plug 100 includes the main body 110, the prongs 120, and the cable 130. The prongs 120 are for electrically connecting to an alternating current source 400 to receive an alternating current power. The cable 130 is electrically connected to the prongs 120 and for electrically connecting to a power input end 210 of an electrical appliance 200. The power plug 100 can receive the alternating current power through the prongs 120 from the alternating current source 400, and the power can be supplied to the electrical appliance 200 through the cable 130. The main body 110 has the housing 113, the USB ports 111, and the power conversion circuit 112. The USB ports 111 and power conversion circuit 112 are arranged internally in the housing 113. The USB ports 111 are for receiving universal serial bus plugs 300 respectively. The power conversion circuit 112 is electrically connected between the prongs 120 and the USB ports 111 for converting the alternating current to the direct current.

Figure 2A:
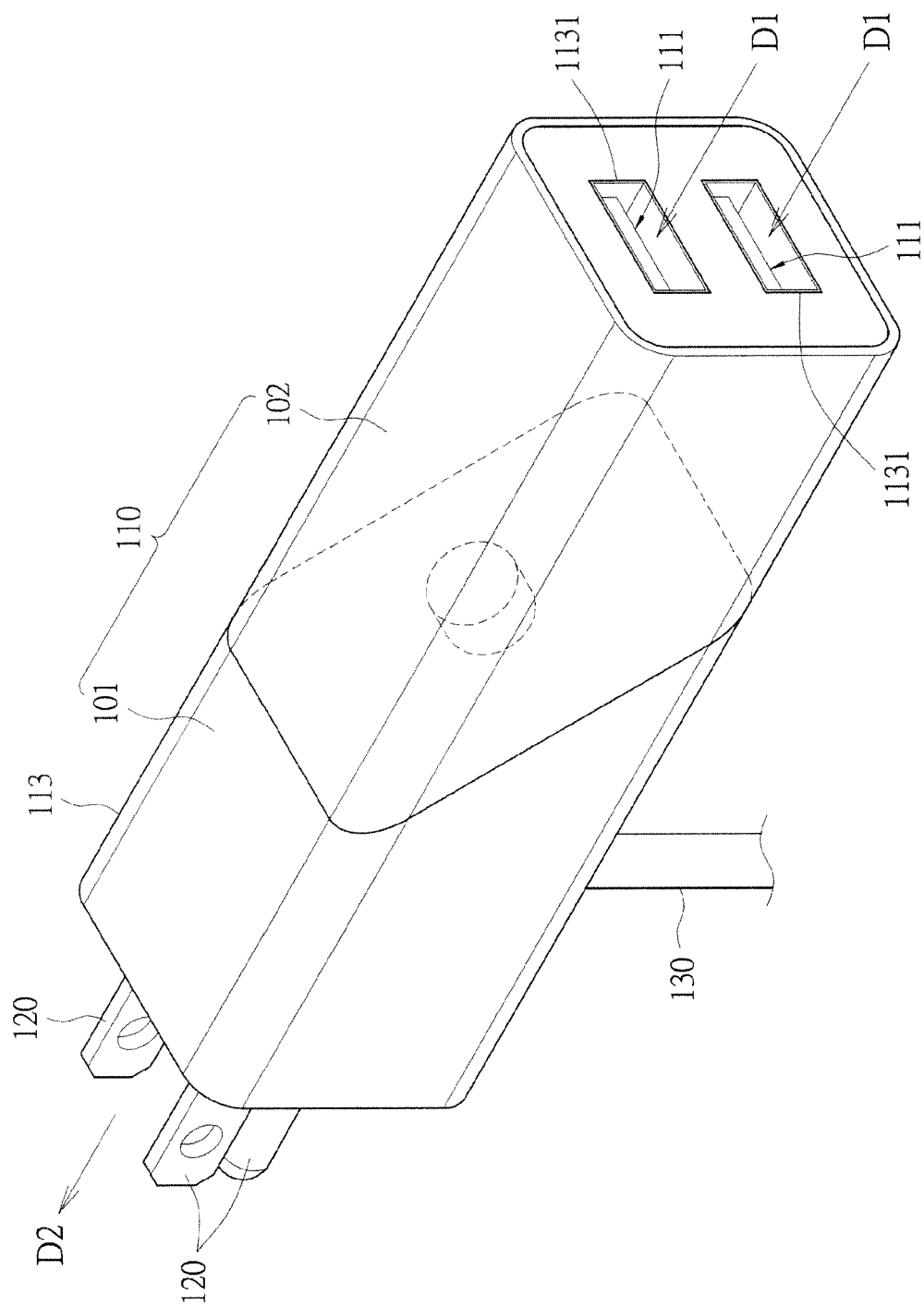
FIGS. 2A and 2B illustrate perspective views of a power plug in accordance with another embodiment of the instant disclosure.
Figure 2B:
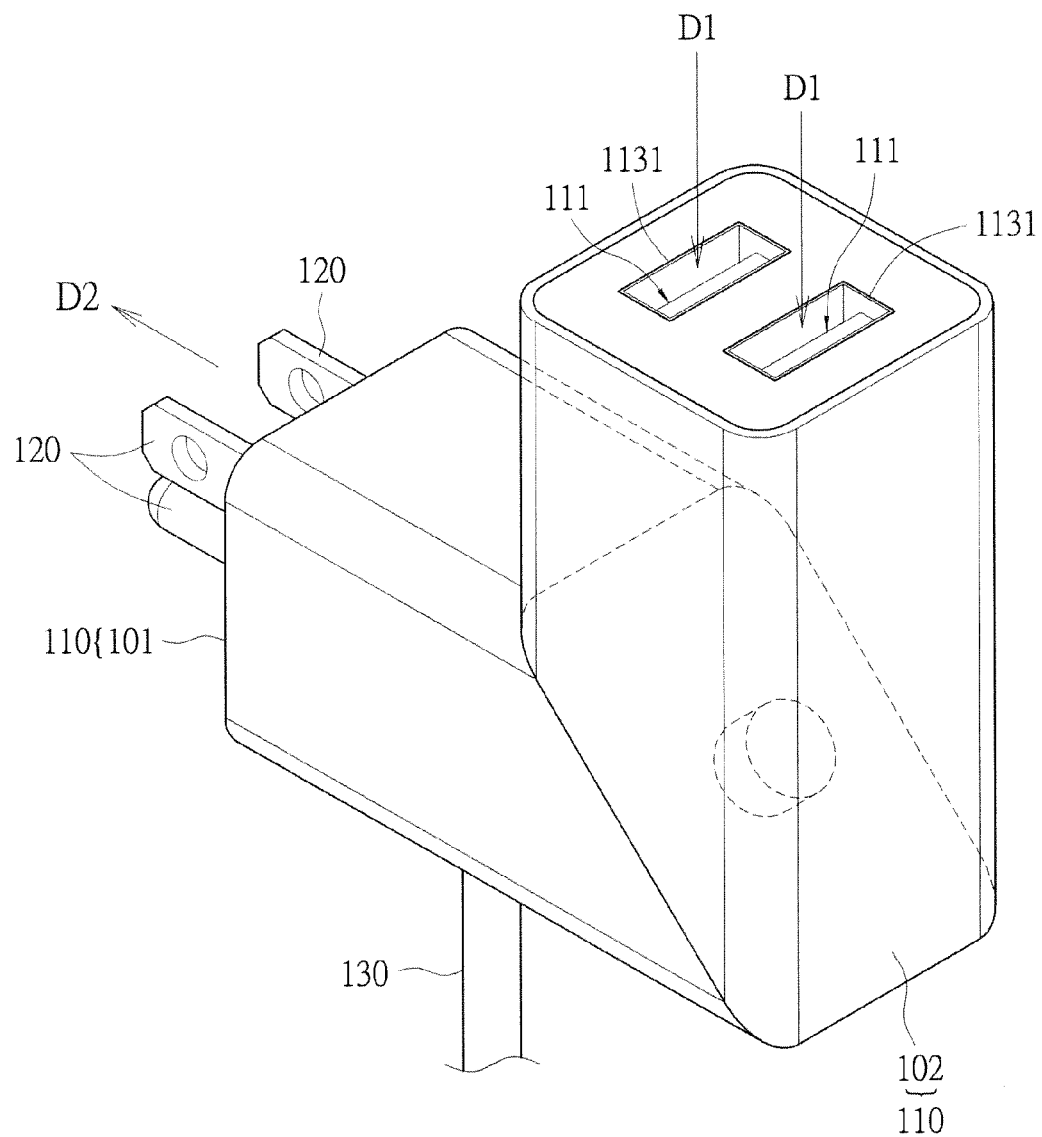

Please refer to FIGS. 2A and 2B, which illustrate perspective views of a power plug in accordance with another embodiment of the instant disclosure. The power plug 100 in the embodiment is similar to the aforementioned power plug 100 and the description hereinafter further explains the difference there-between.

According to the embodiment, the main body 110 can include a first body 101 and a second body 102 pivotally connected to the first body 101. The prongs 120 are disposed on the first body 101, and the USB ports 111 are disposed on the second body 102. When the second body 102 pivots, the receiving direction D1 of each of the USB port 111 is selectably changed with respect to the inserting direction D2 of the prongs 120. The receiving direction D1 of each of the USB port 111 is for example the direction along which a USB plug 300 can be plugged into the receiving end of the USB port 111. The inserting direction D2 of the prongs 120 is for example the direction along which the prongs 120 can be inserted into the slots of a wall socket.

As shown in the FIG. 2A in the instant disclosure, when the second body 102 pivots such that the extension direction of first body 101 and the extension direction of the second body 102 are in parallel with each other, and the appearance of the main body 110 resembling a rectangular box, the prongs 120 are provided on the side surface of the rectangular box, and the two USB ports 111 are provided on the side surface of the rectangular box opposite to the side surface. In addition, the receiving directions D1 of the USB ports 111 are in parallel with the inserting direction D2 of the prongs 120.

As shown in the FIG. 2B in the instant disclosure, when the second body 102 pivots such that the extension direction of first body 101 and the extension direction of the second body 102 are perpendicular to each other, forming an L-shaped body, the receiving directions D1 of the USB ports 111 are perpendicular to the inserting direction D2 of the prongs 120.

Figure 3A:
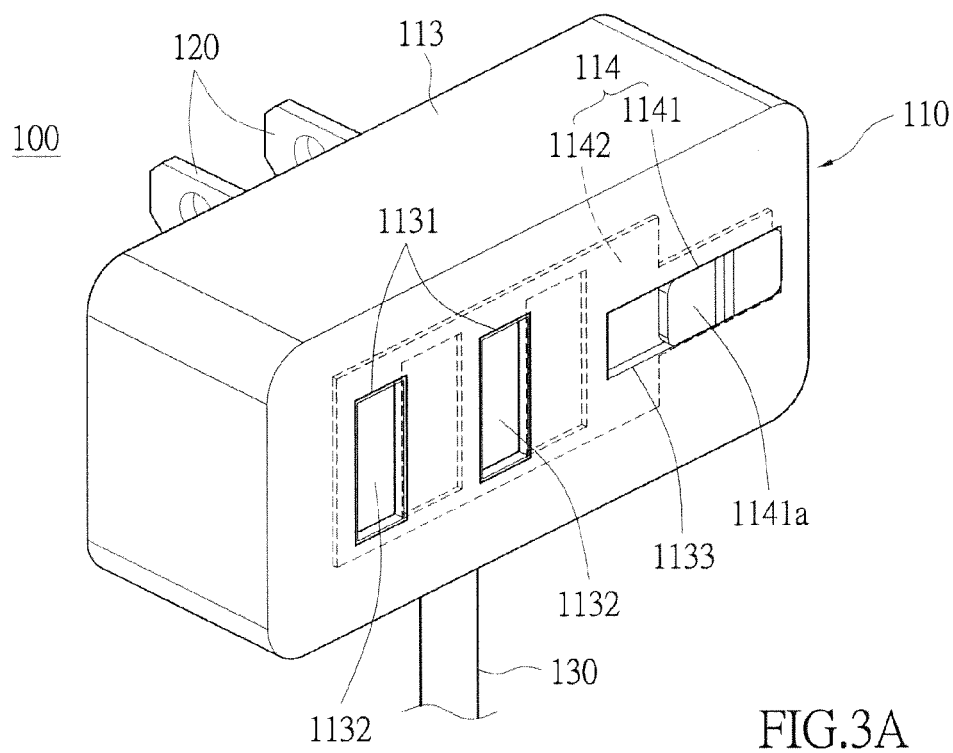
FIGS. 3A and 3B illustrate a perspective view of a power plug in accordance with another embodiment of the instant disclosure.
Figure 3B:
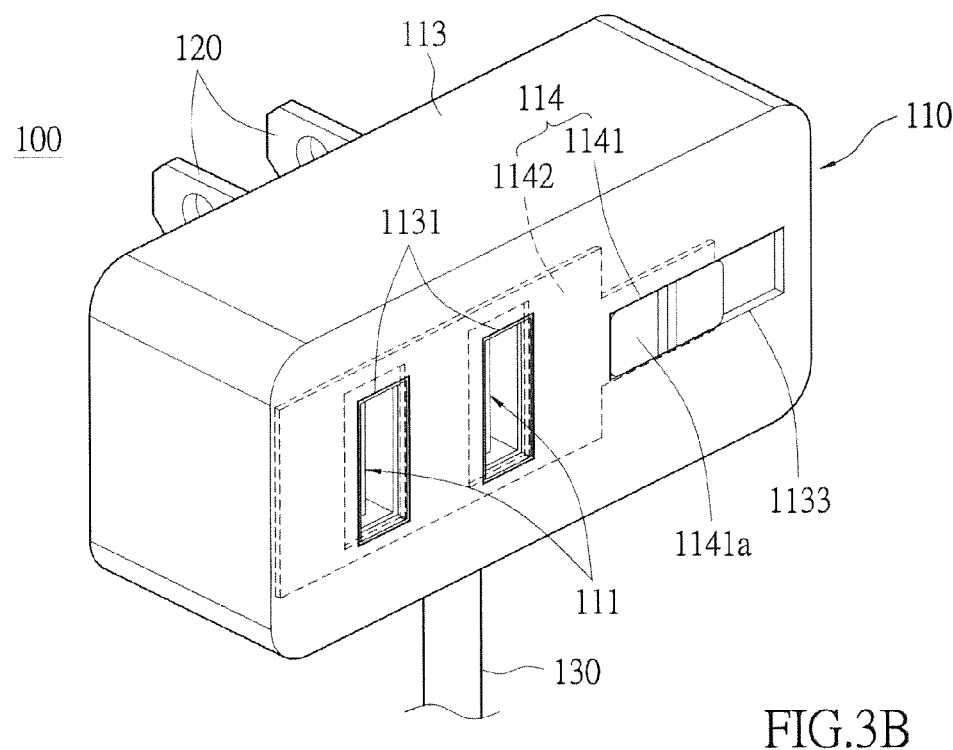

Please refer to FIGS. 3A and 3B, which illustrate a perspective view of a power plug in accordance with another embodiment of the instant disclosure. The power plug 100 in the embodiment is similar to the aforementioned power plug 100 and the description hereinafter further explains the difference there-between.

According to the embodiment, the housing 113 has a slidable cover 1132 for selectably covering the slot 1131. To put it concretely, the main body 110 can have an adjustable mechanism 114 arranged in the housing 113. The adjustable mechanism 114 can include an adjustable component 1141 and an adjustable plate 1142 connecting thereto, and the slidable cover 1132 could be portion of the adjustable plate 1142. The adjustable mechanism 114 is configured such that the user can slide the adjustable component 1141 to further move the adjustable mechanism 114. By adjusting the position of the adjustable mechanism 114, the position of the slidable cover 1132 with respect to the slot 1131 can be changed correspondingly.

As shown in the FIGS. 3A and 3B in the instant disclosure, a button 1141*a* of the adjustable component 1141, which is protruding from the adjustable plate 1142, is arranged in a guiding groove 1133 of the housing 113. The user can slide the button 1141*a* to move the adjustable mechanism 114, so as to change the position of the slidable cover 1132 with respect to the slot 1131 correspondingly.

According to the disclosed embodiments, the power plug 100 enhances a consumer's ability to directly use the power plug 100 electrically connecting to an electric appliance 200 to recharge or power one or more portable electronic devices that rely on a USB port for powering and recharging. The power plug 100 is configured to provide more than one USB port 111 for different voltage levels, such as 5V and 12V for connecting to one or more portable electronic devices when plugged into an alternating current source 400 such a wall socket.

It is worth noting that the power plug 100 having the USB port 111 is configured to having a compact design and the USB port 111 is permanent, which means the USB port 111 is not easily removable from the main body 110. In addition, the USB port 111 is integratedly implemented to the main body 110, there's no need to have a docking connection port docked into the main body 110 for connecting between the USB port 111 and the main body 110. In addition, the consumer don't need to have an adaptor connected to the power plug 100 to use the power plug 100 to recharge or power a portable electronic device that rely on a USB port for powering and recharging.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A power plug, electrically connected to a power input end of an electrical appliance, comprising:
   a main body having a universal serial bus port for receiving a universal serial bus plug;
   at least two prongs disposed on the main body for receiving a power, the prongs being configured to be insertable into an alternating current source; and
   a cable disposed on the main body and electrically connected to the prongs, the cable being electrically connected to the power input end of the electrical appliance.

2. The power plug of claim 1, wherein the main body has a power conversion circuit for converting the alternating current to the direct current, the power conversion circuit is respectively electrically connected to the prongs and the universal serial bus port.

3. The power plug of claim 2, wherein the main body has a housing, the housing encloses the universal serial bus port, and the housing has a slot for exposing a receiving end of the universal serial bus port.

4. The power plug of claim 3, wherein the housing encloses the power conversion circuit.

5. The power plug of claim 2, wherein the housing has a slidable cover for selectably covering the slot.

6. The power plug of claim 2, wherein the main body has two of the universal serial bus ports, and the power conversion circuit is to convert the alternate current to the direct currents respectively having a first voltage level and a second voltage level.

7. The power plug of claim 1, wherein the main body includes a first body and a second body pivotally connected to the first body, the prongs are disposed on the first body, the universal serial bus port is disposed on the second body, and the receiving direction of the universal serial bus port is selectably changed with respect to the inserting direction of the prongs when the second body pivots.

8. A power plug, electrically connected to a power input end of an electrical appliance, comprising:
   a main body having a universal serial bus port for receiving a universal serial bus plug;
   at least two prongs disposed on the main body for receiving an alternating current power, the prongs being configured to be insertable into an alternating current source; and
   a cable disposed on the main body and electrically connected to the prongs for receiving the alternating current power, the cable being electrically connected to the power input end of the electrical appliance for delivering the alternating current power to the electrical appliance.

9. The power plug of claim 8, wherein the main body has a power conversion circuit for converting the alternating current to the direct current, the power conversion circuit is respectively electrically connected to the prongs and the universal serial bus port.

10. The power plug of claim 9, wherein the main body has a housing, the housing encloses the universal serial bus port, and the housing has a slot for exposing a receiving end of the universal serial bus port.

11. The power plug of claim 10, wherein the housing encloses the power conversion circuit.

12. The power plug of claim 9, wherein the housing has a slidable cover for selectably covering the slot.

13. The power plug of claim 9, wherein the main body has two of the universal serial bus ports, and the power conversion circuit is to convert the alternate current to direct currents respectively having a first voltage level and a second voltage level.

14. The power plug of claim 8, wherein the main body includes a first body and a second body pivotally connected to the first body, the prongs are disposed on the first body, the universal serial bus port is disposed on the second body, and the receiving direction of the universal serial bus port is selectably changed with respect to the inserting direction of the prongs when the second body pivots.

* * * * *